3,541,206
PREVENTIVE TREATMENT FOR INFECTIOUS VIRAL EQUINE RESPIRATORY DISEASE, EQUINE ENCEPHALOMYELITIS AND EQUINE TETANUS, AND VACCINE THEREFOR
Richard L. Hall, 8217 N. Main St., Eden, N.Y. 14057
No Drawing. Continuation-in-part of application Ser. No. 293,286, July 8, 1963. This application May 1, 1967, Ser. No. 634,829
Int. Cl. A61k 27/00
U.S. Cl. 424—89     5 Claims

ABSTRACT OF THE DISCLOSURE

Inoculation of equines with a vaccine developed from human influenza virus has proven effective in combating equine influenza. Protective antibody response against influenza, tetanus and encephalomyelitis by inoculating an equine with a vaccine combining influenza and encephalomyelitis vaccines and tetanus toxoid is demonstrated.

---

This application is a continuation-in-part of my pending application Ser. No. 293,286 filed July 8, 1963 now abandoned for Preventive Treatment for Infectious Viral Equine Respiratory Disease.

BACKGROUND OF THE INVENTION

This invention relates to a new and useful preventive treatment for infectious viral equine respiratory disease, commonly identified as equine influenza and sometimes called equine cough, and for tetanus and encephalomyelitis in equines.

Equine influenza has been a specific diagnosis since the early 19th century. It is a relatively broad term, covering a wide variety of symptoms, lesions and complications, and describes a complex including within its scope distinct viral entities.

This disease has assumed many forms over the years, all quite contagious. It is troublesome, particularly wherever large numbers of horses are stabled, as at tracks. Also, it is a source of economic loss, because the animal is incapacitated. Once infected, the horse must be given rest and removed from work or racing, as the case may be, for periods which can run as long as from one to six months, and even a year.

Heretofore, no effective method of preventive treatment for equine influenza has been available. Attempts have been made to inoculate horses against the disease, using a vaccine developed from the specific virus taken from infected horses, but these have met with only slight success. Such vaccines have been of only limited effectiveness, even against that particular viral infection, and of even less effectiveness against other types of influenza infection.

Indeed, these prior attempts at inoculation against equine influenza have been of such limited effectiveness, that they have not been generally accepted by veterinarians, and it is not customary to inoculate horses using such vaccines. However, notwithstanding the marked lack of success with such vaccines, efforts to develop a specific vaccine from the specific species of animal have continued. The belief, that it is necessary to use the specific virus causing the infection, taken from the particular species which is infected, persists. Indeed, this belief would appear to be reinforced by the fact that heretofore, once the horse was infected with equine influenza, it usually was thereby immunized against reinfection at a later date.

A previously unfamiliar epidemic respiratory disease appeared in the United States early in 1963, the earliest cases appearing in Florida. At one thoroughbred track, an outbreak of equine influenza spread through twenty-three barns during a twenty-eight day period, infecting about 80% of the horses. This form of influenza then became widespread, particularly among racing horses. Of twenty-four harness racing meets during approximately the first five months of 1963, only four reported no equine influenza. Most of the others experienced serious epidemics which in some cases impaired scheduled races, and even necessitated temporary closing of the track. The first harness track was infected on Apr. 12, 1963, near Buffalo, N.Y.

In addition to racing stables, this epidemic was a serious problem at horse shows, riding stables and with work horses. Also, unlike typical previous epidemics, it affected older horses which had been infected in prior years, as well as younger horses being infected for the first time.

Also, it has been the practice to vaccinate horses against tetanus and encephalomyelitis by separately inoculating them with tetanus toxoid on the one hand, and with encephalomyelitis vaccine on the other. Such inoculations are customarily made on separate occasions. Where the horse also is to be inoculated against influenza, that too is done as a separate and distinct vaccination procedure.

For example, influenza vaccine is customarily given intramuscularly or subcutaneously in two doses at 14–21 day intervals, tetanus toxoid is customarily given intramuscularly in two doses at 21–30 day intervals, and encephalomyelitis vaccine customarily is given at 21–30 day intervals. It also is customary to space vaccinations by 7–10 day intervals, to avoid antagonistic reactions in antibody response.

This practice has the disadvantage that the multiple vaccination procedures prolong the interruption of training programs, are relatively expensive and often result in "needle-shy" horses. However, these three vaccines are very dissimilar, with tetanus toxoid being developed from bacteria and therefore quite different from the virus vaccines for influenza and encephalomyelitis which themselves are different in many aspects.

SUMMARY OF THE INVENTION

Accordingly, a primary object of my invention is to provide a truly effective method of preventive treatment for equine influenza.

Another primary object of my invention is to provide an effective method of preventive treatment for influenza, encephalomyelitis and tetanus in equines without resort to separate vaccines and vaccination procedures.

Another object of my invention is to provide the foregoing in a simple and inexpensive method free of undesirable side effects.

Briefly stated, I have discovered that, contrary to the popular belief that an effective vaccine against equine influenza must be derived from the specific virus in the specific species, unexpectedly successful results are obtained when the horse is inoculated with a vaccine developed from human influenza virus. Indeed, I have obtained substantially 100% effectiveness in combating equine influenza, with no adverse effects whatever.

Contrary to what might be expected when applying a foreign species virus as a vaccine, it appears that the antigen structure of the foreign (i.e. human) virus sensitizes the respiratory system calls of the horse so that when these calls are attacked by a host susceptible equine influenza virus, they generate antibody protection against clinical illness. This is true, even though the vaccine is nonspecific as to the virus as well as to the species.

Indeed, by providing the sensitizing antigen in the foreign, human virus, a clearly synergistic action occurs. Whereas virtually no protection has been obtained when the sensitizing antigen has been provided in the specific species virus, I am able to obtain virtually complete immunization. The provision of foreign antigens along with what can be presumed to be a common antigen results in an unexpectedly great increase in antibody protection.

In addition, I have discovered that protective antibody response is obtainable against tetanus and encephalomyelitis, as well as against influenza, when an equine is inoculated with a combination of encephalomyelitis vaccine, tetanus toxoid and an influenza vaccine containing a human influenza virus strain.

Contrary to what might be expected because of the differences between the individual vaccines and their respective methods of derivation, it appears that the combining of these three vaccines does not result in an interference in developing antibodies.

DESCRIPTION OF ILLUSTRATIVE EMBODIMENTS

Test Results—Equine Influenza

Group I

Forty horses stabled in barn A at a training track near Buffalo, N.Y. were used for this test. Nine of those horses were selected for vaccination, and the remaining thirty-one were left unvaccinated, as controls.

The nine vaccinates were given three doses of vaccine, at 14-day intervals, the first dose being given on Mar. 1, 1963. The vaccine and dosages are as follows:

1st Dose

| | CCA units |
|---|---|
| Asian | 1000 |
| PR-8 | 500 |
| AA/1/57 | 500 |
| Great Lakes | 500 |

2nd Dose

| | |
|---|---|
| Asian | 1500 |
| PR-8 | 750 |
| AA/1/57 | 750 |
| Great Lakes | 750 |

3rd Dose

| | |
|---|---|
| Asian | 1500 |
| PR-8 | 750 |
| AA/1/57 | 750 |
| Great Lakes | 750 |

The vaccine was a human influenza virus vaccine from allantoic fluid of chick embryo infected with types A, A-prime, Asian and B influenza virus, formaldehyde inactivated.

The vaccine was injected subcutaneously into the prescapular chest space. There was the expected reaction, in the form of edema which appeared within twenty-four hours, with slight soreness and inflammation. This resolved in forty-eight–sixty hours past vaccination, and the horses did not go off their feed or show any other reactions. The horses were lightly exercised immediately after vaccination, care being taken not to overheat them, and once the edema was received regular training was resumed.

None of the thirty-one non-vaccinates became ill with equine influenza during the vaccination program, thus showing that the human vaccine virus did not become hot to the unvaccinated controls.

Eighteen of the forty horses, including the nine vaccinates, were taken to the Buffalo Raceway on about Mar. 25, 1963, between the second and third vaccinations. This raceway is the track referred to above. All nine of the non-vaccinates became ill with equine influenza during the period from Apr. 15 through Apr. 25, 1963. None of the vaccinates became sick, however, with but one exception. The one infected vaccinate had no fever, missed only one meal, showed slight rhinitis, and was normal and back into training within twenty-four hours, with no treatment or medication of any kind.

Thus, the vaccinates were exposed to the equine influenza virus, but only one out of the nine became ill, and then only to such slight degree as to be virtually no problem.

The twenty-two controls remaining on the farm also became very ill with equine influenza during the period from April 15 through April 25, apparently because two of them were raced at the Buffalo Raceway on about April 10th, and then brought the infection back to the farm.

Group II

Three colts were vaccinated at barn B, at the Buffalo Raceway. These three vaccinates were given only one dose, being the equivalent of the second dose in the above described test, on Mar. 23, 1963. Although these three vaccinates were stabled in the barn that was the most heavily infected with equine influenza, in the epidemic affecting the Buffalo Raceway on about April 12th, not a single vaccinate became ill with equine influenza even though every other horse in the barn did.

Test Results—Combining Equine Influenza, Tetanus Toxoid and Encephalomyelitis

Horse No. 66-33

This horse was vaccinated by intraderval injection into the left chest area, at two sites, on two occasions, each time with a vaccine consisting of:

| | Cc. |
|---|---|
| TCO Encephalomyelitis vaccine—equine [1]—Eastern [EEE] and Western [WEE] | 1 |
| Equine influenza vaccine [2] | 2 |
| Tetanus toxoid—Equine [3] | 1 |

[1] Jensen-Salsbery Laboratories, Division of Richardson Merrell Inc., 520 W. 21st St., Kansas City, Mo., Investigational Serial No. 3.

[2] Human strains:
PR/8/34 (type A) 200 CCA units/cc.
AA/1/57 (type $A_1$) 200 CCA units/cc.
Jap/304/57 (type $A_2$) 200 CCA units/cc.
Jap/170/62 (type $A_2$) 200 CCA units/cc.
Equine strains:
A/equi 1/prague/56 300 CCA units/cc.
A/equi 2/richelieu/63 300 CCA units/cc.

[3] Jensen-Salsbery Serial No. 603-alum precipitated.

The horse was bled on each occasion, and on two subsequent occasions. The serums thereby obtained were tested for antibody titers. The results of such tests are set forth in Table I below.

TABLE I

| Results | Bled and vacc. 1/18/66 | Bled and vacc. 1/30/66 | Bled 2/9/66 | Bled 7/7/66 |
|---|---|---|---|---|
| TCO enceph.: | | | | |
| EEE | <10 | 40 | 80 | 20 |
| WEE | <10 | 80 | 80 | 80 |
| Influenza: | | | | |
| A/1 | 40 | 160 | 160 | 80 |
| A/2 | 10 | 20 | 20 | 10 |
| Tetanus | Neg. | 2 units | >2 units | |

This rise in titers indicates a protective antibody response against all three diseases, using a combined vaccine for simultaneous inoculation.

Accordingly, it is seen that my invention provides a substantially completely effective preventive treatment for equine influenza. The use of a foreign (i.e. human) influenza virus protects the horse far more effectively than a specific virus taken from the same species, this unexpected immunity being the result of a synergistic action resulting from introduction of the foreign virus into the animal body.

Also, my invention provides a preventive treatment for influenza, tetanus and encepholomyelitis in equines, with a single vaccine comprising a mixture of influenza vaccine, encephalomyelitis vaccine and tetanus toxoid, mixed together for simultaneous inoculation in the equine.

It will be understood that the foregoing is given by way of illustration, and that I intend to be limited only as required by the scope of the appended claims.

What I claim is:

1. The preventive treatment of equine influenza which comprises inoculation with human influenza virus.

2. The preventive treatment of claim 1 which comprises inoculation by periodic injection of human influenza virus.

3. The preventive treatment of claim 1 which comprises inoculation by periodic subcutaneous injection of human influenza virus into the prescapular chest space.

4. The preventive treatment of claim 1 which comprises inoculation with groups A, B and Asian human influenza virus.

5. The preventive treatment of claim 1 which comprises inoculation with Asian, PR–8, AA/1/57 and Great Lakes human influenza virus.

References Cited

Brander et al., The Veterinary Record, vol. 77, No. 19, pp. 548 and 549, May 8, 1965.

Bryans et al., Journal of the American Veterinary Medical Association, vol. 148, No. 4, pp. 413–417, Feb. 15, 1966.

The Merck Veterinary Manual, published by Merck & Co., Inc., Rahway, N.J., 1955, pp. 320 and 382.

RICHARD L. HUFF, Primary Examiner